United States Patent
Tasoulas et al.

(10) Patent No.: US 11,528,238 B2
(45) Date of Patent: Dec. 13, 2022

(54) SYSTEM AND METHOD FOR PROVIDING A DYNAMIC CLOUD WITH SUBNET ADMINISTRATION (SA) QUERY CACHING

(71) Applicant: ORACLE INTERNATIONAL CORPORATION, Redwood Shores, CA (US)

(72) Inventors: Evangelos Tasoulas, Oslo (NO); Bjørn Dag Johnsen, Oslo (NO); Ernst Gunnar Gran, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/995,590

(22) Filed: Aug. 17, 2020

(65) Prior Publication Data

US 2020/0379799 A1 Dec. 3, 2020

Related U.S. Application Data

(63) Continuation of application No. 16/262,637, filed on Jan. 30, 2019, now Pat. No. 10,747,575, which is a (Continued)

(51) Int. Cl.
*H04L 49/351* (2022.01)
*H04W 4/60* (2018.01)
(Continued)

(52) U.S. Cl.
CPC .......... *H04L 49/351* (2013.01); *G06F 9/4856* (2013.01); *H04L 9/40* (2022.05);
(Continued)

(58) Field of Classification Search
CPC ... G06F 9/4856; H04L 49/351; H04L 49/901; H04L 49/90; H04L 49/9094; H04L 67/34
See application file for complete search history.

(56) References Cited

U.S. PATENT DOCUMENTS 5,732,072 A 3/1998 Thanner et al.
8,364,891 B2 1/2013 Margolus et al.
(Continued)

FOREIGN PATENT DOCUMENTS

CN 104094229 10/2014
CN 104094230 10/2014
(Continued)

OTHER PUBLICATIONS

Korean Intellectual Property Office, Notice of Office Action dated Apr. 28, 2021 for Korean Patent Application No. 10-2017-7010407, 9 pages.
(Continued)

*Primary Examiner* — Kyung H Shin
(74) *Attorney, Agent, or Firm* — Tucker Ellis LLP

(57) ABSTRACT

A system and method support can subnet management in a cloud environment. During a virtual machine migration in a cloud environment, a subnet manager can become a bottleneck point that delays efficient service. A system and method can alleviate this bottleneck point by ensuring a virtual machine retains a plurality of addresses after migration. The system and method can further allow for each host node within the cloud environment to be associated with a local cache that virtual machines can utilize when re-establishing communication with a migrated virtual machine.

17 Claims, 6 Drawing Sheets

Related U.S. Application Data continuation of application No. 14/924,281, filed on Oct. 27, 2015, now Pat. No. 10,198,288.

(60) Provisional application No. 62/133,179, filed on Mar. 13, 2015, provisional application No. 62/121,294, filed on Feb. 26, 2015, provisional application No. 62/076,336, filed on Nov. 6, 2014, provisional application No. 62/075,000, filed on Nov. 4, 2014, provisional application No. 62/072,847, filed on Oct. 30, 2014.

(51) Int. Cl.
*H04L 67/00* (2022.01)
*H04L 9/40* (2022.01)
*H04L 67/568* (2022.01)
*H04L 49/901* (2022.01)
*G06F 9/48* (2006.01)

(52) U.S. Cl.
CPC ............ *H04L 49/901* (2013.01); *H04L 67/34* (2013.01); *H04L 67/568* (2022.05); *H04W 4/60* (2018.02)

(56) References Cited

U.S. PATENT DOCUMENTS

| | | | |
|---|---|---|---|
| 9,014,201 | B2 | 4/2015 | Bogdanski |
| 9,641,465 | B1* | 5/2017 | Gabbay ................. H04L 49/901 |
| 9,852,073 | B2 | 12/2017 | Peterson et al. |
| 2008/0186990 | A1 | 8/2008 | Abali et al. |
| 2008/0189432 | A1* | 8/2008 | Abali ....................... H04L 67/34 709/238 |
| 2011/0164617 | A1 | 7/2011 | Yong |
| 2013/0039169 | A1 | 2/2013 | Schlansker et al. |
| 2013/0138836 | A1* | 5/2013 | Cohen ................... H04L 49/351 709/250 |
| 2013/0227097 | A1 | 8/2013 | Yasuda et al. |
| 2013/0254404 | A1 | 9/2013 | Johnsen et al. |
| 2013/0254424 | A1* | 9/2013 | Guay ................... G06F 9/4856 709/238 |
| 2014/0101336 | A1 | 4/2014 | Yang et al. |
| 2014/0181292 | A1 | 6/2014 | Venkataswami et al. |
| 2016/0112314 | A1 | 4/2016 | de Silva et al. |
| 2017/0012859 | A1 | 1/2017 | Ye et al. |
| 2017/0104682 | A1 | 4/2017 | Zahid et al. |

FOREIGN PATENT DOCUMENTS

| | | |
|---|---|---|
| CN | 104115121 | 10/2014 |
| JP | 2008102930 | 5/2008 |
| JP | 2010033404 | 2/2010 |
| WO | 2013148598 | 10/2013 |
| WO | 2013148601 | 10/2013 |

OTHER PUBLICATIONS

Clark, et al., "Live Migration of Virtual Machines", Proceedings of the Symposium on Networked Systems Design and Implementation, USENIX Association, Berkeley, CA, US, May 2, 2005-May 4, 2005, pp. 273-286, 14 pages.

Tasoulas et al., "A Novel Query Caching Scheme for Dynamic Infiniband Subnets", 2015 15th IEEE/ACM International Symposium on Cluster, Cloud and Grid Computing, May 4, 2015-May 7, 2015, pp. 199-210, 12 pages.

International Search Report and the Written Opinion of the International Searching Authority issued for PCT Application No. PCT/US2015/058118, dated Jan. 12, 2016, 14 pages.

International Search Report and the Written Opinion of the International Searching Authority issued for PCT Application No. PCT/US2015/057860, dated Feb. 4, 2016, 13 pages.

Japanese Office Action for Japanese Patent Application No. 2017522887, dated Jun. 18, 2019, 6 pages.

United States Patent and Trademark Office, Notice of Allowance dated Jun. 27, 2017 for U.S. Appl. No. 14/927,085, 12 pages.

Communication pursuant to Article 94(3) EPC for European Patent Application No. 15791175.1, dated Jul. 31, 2019, 8 pages.

Chinese Office Action for Chinese Patent Application No. 201580056123.X, dated Sep. 16, 2019, 8 pages.

European Patent Office, Provision of the minutes in accordance with Rule 124(4) EPC dated Nov. 20, 2020 for EP Application No. 15791175.1, 5 pages.

European Patent Office, Communication under Rule 71(3) EPC, Intention to grant dated Jan. 20, 2021 for EP Application No. 15791175.1, 11 pages.

Korean Intellectual Property Office, Notice of Office Action dated Jun. 7, 2021 for Korean Patent Application No. 10-2017-7010675, 9 pages.

* cited by examiner

SYSTEM AND METHOD FOR PROVIDING A DYNAMIC CLOUD WITH SUBNET ADMINISTRATION (SA) QUERY CACHING

CLAIM OF PRIORITY

This application is a continuation of and claims the benefit of priority to U.S. patent application entitled "SYSTEM AND METHOD FOR PROVIDING A DYNAMIC CLOUD WITH SUBNET ADMINISTRATION (SA) QUERY CACHING", application Ser. No. 16/262,637, filed on Jan. 30, 2019, which application is a continuation of and claims the benefit of priority to U.S. patent application entitled "SYSTEM AND METHOD FOR PROVIDING A DYNAMIC CLOUD WITH SUBNET ADMINISTRATION (SA) QUERY CACHING", application Ser. No. 14/924,281, filed on Oct. 27, 2015, which application claims the benefit of priority to U.S. Provisional Application titled "SYSTEM AND METHOD FOR PROVIDING A DYNAMIC CLOUD WITH SUBNET ADMINISTRATION (SA) QUERY CACHING", Application No. 62/072,847, filed Oct. 30, 2014, U.S. Provisional Application titled "SYSTEM AND METHOD FOR PROVIDING A DYNAMIC CLOUD WITH SUBNET ADMINISTRATION (SA) QUERY CACHING", Application No. 62/075,000, filed Nov. 4, 2014, U.S. Provisional Application titled "SYSTEM AND METHOD FOR PROVIDING A DYNAMIC CLOUD WITH SUBNET ADMINISTRATION (SA) QUERY CACHING", Application No. 62/076,336, filed Nov. 6, 2014, U.S. Provisional Application titled "SYSTEM AND METHOD FOR PROVIDING A DYNAMIC CLOUD WITH SUBNET ADMINISTRATION (SA) QUERY CACHING", Application No. 62/121,294, filed Feb. 26, 2015, and U.S. Provisional Application titled "SYSTEM AND METHOD FOR PROVIDING A DYNAMIC CLOUD WITH SUBNET ADMINISTRATION (SA) QUERY CACHING", Application No. 62/133,179, filed Mar. 13, 2015, each of which applications are herein incorporated by referenced.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a cloud environment.

BACKGROUND

In InfiniBand subnets the Subnet Manager (SM) is a potential bottleneck. When an InfiniBand subnet grows in size, the number of paths between hosts increases polynomially and the SM may not be able to serve the network in a timely manner when many concurrent path resolution requests are received. This scalability challenge is further amplified in a dynamic virtualized cloud environment. When a Virtual Machine (VM) with InfiniBand interconnect live migrates, the VM addresses change. These address changes result in additional load to the SM as communicating peers send Subnet Administration (SA) path record queries to the SM to resolve new path characteristics.

SUMMARY

A system and method can support subnet management in a cloud environment. During a virtual machine migration in a cloud environment, a subnet manager can become a bottleneck point that delays efficient service. A system and method can alleviate this bottleneck point by ensuring a virtual machine retains a plurality of addresses after migration. The system and method can further allow for each host node within the cloud environment to be associated with a local cache that virtual machines can utilize when re-establishing communication with a migrated virtual machine.

DETAILED DESCRIPTION

Figure 1:
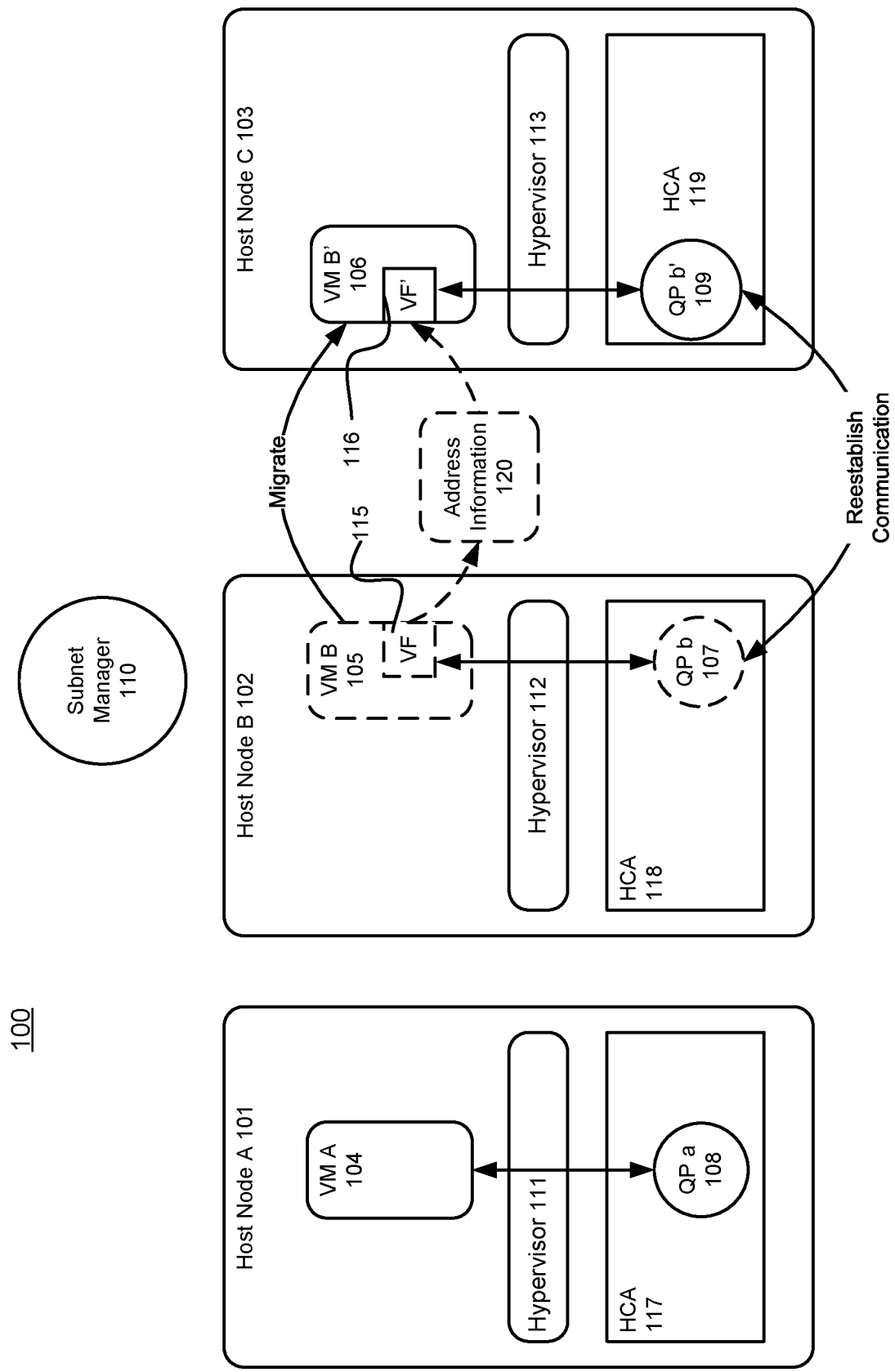
FIG. 1 shows an illustration of supporting VM live migration in a cloud environment, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the InfiniBand (IB) network protocol as an example for a high performance network protocol. It will be apparent to those skilled in the art that other types of high performance network protocols can be used without limitation.

Described herein are systems and methods that can support virtual machine (VM) migration subnet administration (SA) path caching in a cloud environment.

In accordance with an embodiment, cloud computing capable of offering High Performance Computing (HPC) can be provided. This HPC-as-a-service can be provided within a computing cloud and allow for and accommodate virtual HPC (vHPC) clusters using high performance interconnect solutions.

In accordance with an embodiment, each IB subnet can utilize a Subnet Manager (SM). Each SM can be responsible for the network initialization, topology discovery, path computation, and configuration of IB ports on switches and Host Channel Adapters (HCAs). In large subnets, the available paths between nodes can grow polynomially and the SM can become a potential bottleneck when many concurrent requests for path resolution are received. This scalability challenge is further amplified in a dynamic virtualized cloud environment, when a virtual machine with IB interconnect live migrates.

In order to support efficient virtualization, while maintaining high bandwidth and low latency, IB Host Channel Adapters (HCAs) can support Single Root I/O Virtualization (SR-IOV). Each IB connected node has three different addresses. When a live migration happens, regardless of the downtime attributed to the detaching of the passed through interface, one or more of the IB addresses can change. Other nodes communicating with the VM-in-migration lose connectivity and try to find the new address to reconnect to by sending Subnet Administration (SA) path record queries to the SM. The resulting communication in the underlying network towards the SM can be significant. In a large network, this message flooding towards the SM, caused by VMs migrating, can increase the overall network latency as the load on the SM increases.

In accordance with an embodiment, then, it is desirable to decrease the load on the SM by decreasing the amount of SA requests received by the SM caused by a VM migration. Methods and systems can accomplish this by implementing a system whereby a VM can retain its same addresses after a migration. In addition, a SA path caching mechanism can be used to drastically reduce the number of SA queries after an initial connection between two nodes is established.

In accordance with an embodiment, InfiniBand generally uses three different types of addresses. First, a 16-bit Local Identifier (LID). At least one LID is assigned to each HCA port and each switch by the SM. The LIDs can be used to route traffic within a subnet. Since the LID is 16 bits long, 65536 unique address combinations can be made, of which only 49151 (0x0001-0xBFFF) can be used as unicast addresses. Consequently, the number of available unicast addresses defines the maximum size of an IB subnet.

The second type of address is the 64 bits Global Unique Identifier (GUID), generally assigned by the manufacturer to each device (e.g. HCAs and switches) and each HCA port. The SM may assign additional subnet unique GUIDs to an HCA port, which can be useful when SR-IOV VFs are enabled.

The third type of address is the 128 bits Global Identifier (GID). The GID is generally a valid IPv6 unicast address, and at least one is assigned to each HCA port and each switch. The GID is formed by combining a globally unique 64 bits prefix assigned by the fabric administrator, and the GUID address of each HCA port.

The description of the invention as following uses the Infiniband network as an example for a high performance network. It will be apparent to those skilled in the art that other types of high performance networks can be used without limitation. Also, the description of the invention as following uses the KVM virtualization model as an example for a virtualization model. It will be apparent to those skilled in the art that other types of virtualization models (e.g., Xen) can be used without limitation.

The description of the invention as follows additionally utilizes OpenStack, OpenSM and the RDS Linux kernel module. OpenStack is cloud-computing software platform comprising a group of interrelated projects that control pools of processing, storage, and networking resources through a data center. OpenSM is an InfiniBand compliant Subnet Manager and Administration which can run on top of OpenIB. RDS (Reliable Datagram Sockets) is a high-performance, low-latency, reliable, connectionless protocol for delivering datagrams. It will be apparent to those skilled in the art that other, similar platforms can be utilized without limitation.

In accordance with an embodiment of the invention, virtualization can be beneficial to efficient resource utilization and elastic resource allocation in cloud computing. Live migration makes it possible to optimize resource usage by moving virtual machines (VMs) between physical servers in an application transparent manner. Thus, virtualization that utilizes a Single Root I/O Virtualization (SR-IOV) method can enable consolidation, on-demand provisioning of resources, and elasticity through live migration.

The IB Architecture is a serial point-to-point full-duplex technology. The IB networks can be referred to as subnets, wherein a subnet consists of a set of hosts interconnected using switches and point to point links. An IB subnet can include at least one subnet manager (SM), which can be responsible for initializing and bringing up the network, including the configuration of all the switches, routers and host channel adaptors (HCAs) in the subnet.

IB supports a rich set of transport services in order to provide both remote direct memory access (RDMA) and traditional send/receive semantics. Independent of the transport service used, the IB HCAs communicate using queue pairs (QPs). A QP is created during the communication setup, and can have a set of initial attributes such as QP number, HCA port, destination LID, queue sizes, and transport service that are supplied. An HCA can handle many QPs, each QP consists of a pair of queues, such as a send queue (SQ) and a receive queue (RQ), and there is one such pair present at each end-node participating in the communication. The send queue holds work requests to be transferred to the remote node, while the receive queue holds information on what to do with the data received from the remote node. In addition to the QPs, each HCA has one or more completion queues (CQs) that are associated with a set of send and receive queues. The CQ holds completion notifications for the work requests posted to the send and receive queue. Even though the complexities of the communication are hidden from the user, the QP state information is kept in the HCA.

Network I/O Virtualization:

In accordance with an embodiment, I/O virtualization (IOV) can be used to share I/O resources and provide protected access to resources from various virtual machines. IOV can decouple a logical device, which can be exposed to a virtual machine, from its physical implementation. One such type of IOV is direct device assignment.

In accordance with an embodiment, direct device assignment can involve a coupling of I/O devices to VMs, with no device sharing between VMs. Direct assignment, or device passthrough, can provide near to native performance with minimum overhead. The physical device is directly attached to the VM, bypassing the hypervisor, and a guest OS can use unmodified drivers. A downside is limited scalability, as there is no sharing; one physical network card is coupled with one VM.

In accordance with an embodiment, Single Root IOV (SR-IOV) can allow a physical device to appear through hardware virtualization as multiple independent lightweight instances of the same device. These instances can be assigned to VMs as passthrough devices, and accessed as Virtual Functions (VFs). SR-IOV eases the scalability issue of pure direct assignment.

Unfortunately, direct device assignment techniques, such as SR-IOV, can present an issue to cloud providers if the implemented systems use transparent live migrations (VM migrations) for data center optimization. The essence of live migration is that the memory contents of a virtual machine are copied over to a remote hypervisor. Then the virtual machine is paused at the source hypervisor, and its operation resumed at the destination to which it was copied. When the underlying system utilizes direct device assignment (such as SR-IOV), the complete internal state of the network interface cannot be copied as it is tied to the hardware. The SR-IOV VFs assigned to a VM are detached, the live migration will run, and a new VF will be attached at the destination.

In a situation where a VM using an IB VF is live migrated, a clear impact on the underlying network fabric and the SM can be introduced, due to a change of all the three addresses of the VM. The LID changes because the VM is moved to a different physical host with a different LID. The virtual GUID (vGUID) that is assigned by the SM to the source VF can change as well, as a different VF will be attached at the destination. Subsequently, since the vGUID is used to form the GID, the GID will change too. As a result, the migrated VM can suddenly be associated with a new set of addresses, and the communication peers of the migrated VM can start sending concurrent SA path record query bursts to the SM, trying to reestablish lost connections with the migrated VM. These queries can cause extra overhead to the SM, and supplementary downtime as a side effect. If the migrated nodes communicate with many other nodes in the network, the SM can become a bottleneck and hamper overall network performance.

In accordance with an embodiment, the methods and systems described herein can reduce and/or eliminate the issues associated with live migration of virtual machines using direct device assignment techniques, such as SR-IOV, that are presented to cloud providers. The methods and systems can overcome the problems presented in the situation where a VM using an IB VF is live migrated.

Virtual Machine (VM) Live Migration

FIG. 1 shows an illustration of supporting VM live migration in a cloud environment, in accordance with an embodiment. As shown in FIG. 1, an InfiniBand (IB) subnet 100 can include a plurality of host nodes A-C 101-103, which support the different hypervisors 111-113.

Additionally, each hypervisor 111-113 allows various virtual machines (VMs) to run on top of it. For example, the hypervisor 111 on the host node A 101 can support the VM A 104, and hypervisor 112 on host node B can support VM B 105. The nodes on which VM A and VM B run can be in communication.

Furthermore, each of the host nodes A-C 101-103 can be associated with one or more host channel adapters (HCAs) 117-119. As shown in FIG. 1, the HCA 117 on the host node A 101 can take advantage the queue pairs (QP), such as QP a 108, which can be used by VM A 104, while the HCA 118 on the host node B 102 can take advantage QP b 107, which can be used by VM B, 105.

In accordance with an embodiment of the invention, input/output virtualization (IOV) can be used to provide I/O resources to the VMs and provide protected access to the shared I/O resources from multiple VMs. IOV can decouple the logical device, which is exposed to a VM from its physical implementation. For example, the single Root I/O Virtualization (SR-IOV) is an I/O virtualization approach for achieving high performance in the virtualization over IB network.

Also, the IB subnet 100 can include a subnet manager 110, which can be responsible for the network initialization, configuration of IB ports on switches and HCAs, topology discovery and path computation.

As shown in FIG. 1, a VM B 105 can be migrated from the hypervisor 112 to the hypervisor 113 (e.g. while in communication with the VM A 105 on the hypervisor 111).

After the migration, the new VM B' 106 may suddenly be exposed to a new set of addresses at the destination host node C 103. Furthermore, the peer VMs (e.g. VM A 104) can start sending subnet administration (SA) path record queries to the SM 110, while trying to reestablish the lost connectivity (VM B' can also send SA path requests to the SM once it is running on the new host node). This is due to the fact that, generally, once a VM migrates, such as VM B migrating from host node B to host node C, the VM's addresses (LID, GUID, GID) change accordingly as they are generally tied to the hardware when using SR-IOV. These SA path queries to the subnet manager can cause significant downtime, and extra overhead to the InfiniBand SM 110. If many migrations take place within a rather short time frame in a large data center, or if migrated nodes are communicating with many other nodes in the network, the SM 110 can become a bottleneck since it may not be able to respond in a timely manner.

In accordance with an embodiment of the invention, the system can reduce the amount of SA queries generated by the participating host nodes A-C 101-103, when the VM B 104 migrates and the IB address information changes.

As shown in FIG. 1, the system can first detach the VM B 104 from the hypervisor 112, e.g. by detaching a virtual function (VF) 115 from the VM B 104. Then, the system can provide the address information 120, which is associated with the VM B 104 to the destination host node C 103, e.g. by assigning the addresses to the next available virtual function, i.e., VF' 116, on the hypervisor 113 on the host node C 103. Finally, after the VM B 104 is migrated to the hypervisor 113 as VM B' 106, the system can expose the VM B' 106 to the address information 120, in order to reestablish the communication with the peer VM (e.g. via the QP b' 109).

Thus, after the migration to the destination host node C 103, the new VM B' 106 can be exposed to the original set of addresses, and there is no need for the peer VM A 104 to send SA path record queries to the SM 110.

In accordance with an embodiment, a system can support VM live migrations of VMs with IB SR-IOV VFs attached. Remote Direct Memory Access (RDMA) can be utilized over a protocol, such as Reliable Datagram Socket (RDS) protocol, to reestablish communication after the migration of the VM.

In accordance with an embodiment, a system can utilize OpenStack, OpenSM and the RDS Linux kernel module. Additionally, a program, which can be called LIDtracker, can be used to keep track of the IB addresses associated with each VM, and can orchestrate the migration process.

In an embodiment, the program can enable OpenSM's option honor_guid2lid_file. Then, the file guid2lid, generated by OpenSM, can then parsed by the program and sorted by GUID in an order, such as ascending order. LIDs are assigned to the GUIDs, starting from one. Each LID assigned to the GUIDs can be referred to as base LIDs for the physical hosts.

In an embodiment, once the base LIDs are assigned, each of the IB enabled OpenStack compute nodes can be scanned for running VMs. Each VM found to be running can be assigned a LID in decreasing order, starting from 49151 (the topmost unicast LID). These LIDs assigned to VMs can be called floating LIDs.

In an embodiment, the floating LIDs can replace the base LIDs in the OpenStack compute nodes where VMs are running. The hypervisor shares the LID with the VMs. In certain embodiments, one VM can be running per hypervisor, and a VM can be migrated to a hypervisor where no other VM is currently running. In other embodiments, multiple VMs can be running on a hypervisor, and a VM can be migrated to another hypervisor, regardless of whether other VMs are currently running on the destination hypervisor.

In an embodiment, when a migration for $VM_x$ is ordered from an API, such as the OpenStack API, the SR-IOV VF can be detached from the VM. When the device removal is completed and the migration is in progress, OpenStack can notify the program that $VM_x$ is moving from one hypervisor, such as $Hypervisor_y$, to a destination hypervisor, such as $Hypervisor_z$. The program can then change the LID of $Hypervisor_y$ back to its Base LID and $Hypervisor_z$ can get the floating LID associated with $VM_x$. The program can also assign the vGUID associated with $VM_x$ to the next available SR-IOV VF at $Hypervisor_z$, the destination hypervisor. During the migration, the VM has no network connectivity.

In accordance with an embodiment, the changes can be applied via a restart. Then, when the migration is completed, OpenStack can add a next available SR-IOV VF to $VM_x$ on $Hypervisor_z$ and the VM can get back its network connectivity. The VM can be exposed to the same IB addresses (LID, vGUID and GID) that it had before the migration. From the perspective of the VM, it appears like the IB adapter was detached for the time needed to migrate and the same IB adapter was reattached since the addresses did not change.

Subnet Administration (SA) Path Caching

In accordance with an embodiment, a local SA path caching mechanism at the end nodes can reduce or eliminate SA queries after an initial connection is established between two nodes. The caching scheme can be generic and when enabled, can alleviate the load on the SM with or without live migrations taking place.

Figure 2:
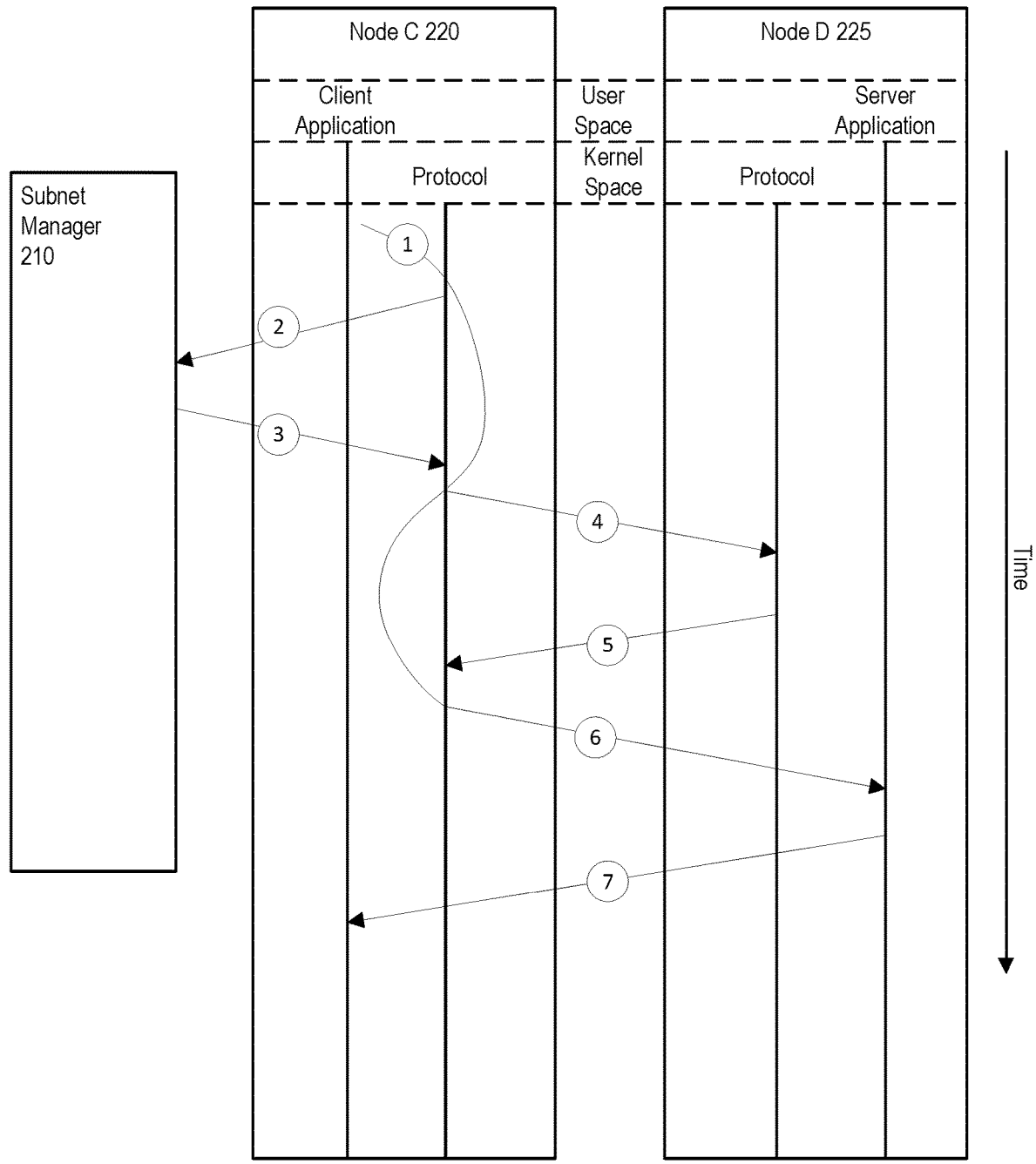
FIG. 2 shows an illustration of a protocol establishing a connection between two hosts, in accordance with an embodiment.

FIG. 2 shows an illustration of a protocol establishing a connection between two hosts, in accordance with an embodiment. More particularly, FIG. 2 illustrates using a protocol, such as RDS, to establish a connection between two hosts.

In accordance with an embodiment, before establishing a connection, IP over IB (IPoIB) can be set up in all communicating peers. A protocol, such as RDS, can use the IPoIB address of a specific IB port to determine the GID address of a port. After a GID address is resolved, the protocol can have sufficient information to perform a path record lookup and establish the IB communication.

As shown in FIG. 2, within an InfiniBand subnet 200, a subnet manager 210 can provide for path communication between node C 220 and node D 225, and more particularly between client side application on node C and server side application on node D. In FIG. 2 the client side of an upper layer application runs in node C and the server side of the application runs in node D. The client side of the application can create a socket, such as an RDS socket, and attempt to communicate with the server side of the application (step 1). The protocol, such as RDS, can send an SA Path Record request to the SM from node C (step 2). The subnet manager can provide a response to the protocol (step 3). This response can include the address information for the target of the client side application. After receiving the response from the subnet manager, the protocol can attempt to initiate a connection with node D by sending a connection request (step 4). If the connection is successful, the protocol can establish a communication channel (step 5), for example via a RDMA_CM_EVENT_ESTABLISHED event in both sides. At this point, the upper layer application can communicate (step 6).

In the event that something goes awry at initial connection, the protocol on the client side (node C) can attempt retry to establish a connection with a random backoff mechanism. The server is not yet aware of the intention of the client to communicate. If anything goes wrong after the connection has been established, both of the RDS sides (the client and the server from an application perspective) will actively engage a reconnection with the peer. The random backoff mechanism in the connection process is useful to avoid race conditions when both sides are engaging a connection.

Figure 3:
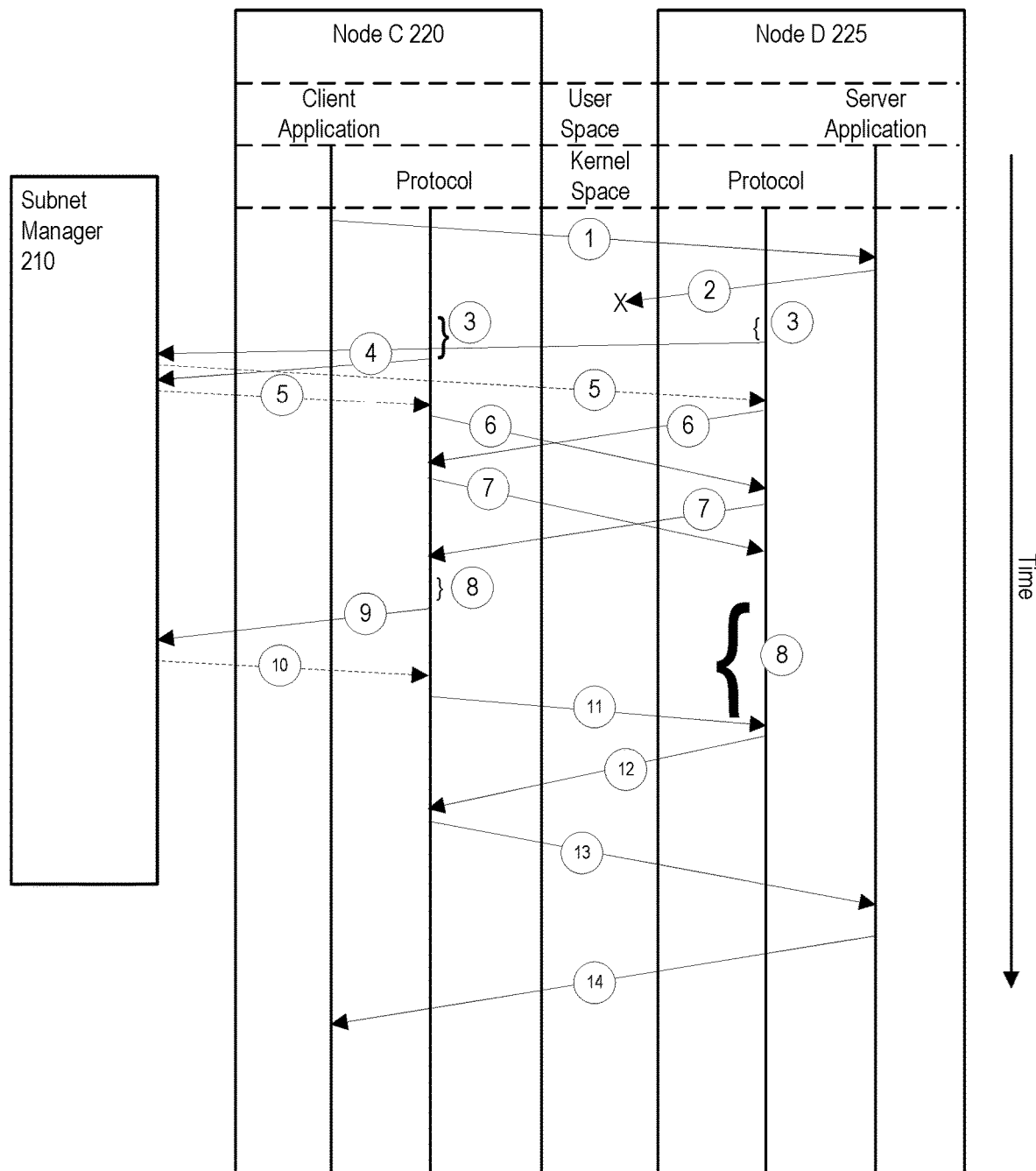
FIG. 3 shows an illustration of ongoing communication between two nodes when a connection drops, in accordance with an embodiment.

FIG. 3 shows an illustration of ongoing communication between two nodes when a connection drops, in accordance with an embodiment.

In FIG. 3, within an InfiniBand subnet 200, a subnet manager 210 can provide for path communication between node C 220 and node D 225, and there is an ongoing communication between node C and node D (step 1) when the connection drops (step 2). The drop in connection can be associated with, for example, a live migration of one of the applications running on the nodes. Both protocol ends can determine that the connection is down and wait for some random time (i.e., backoff time) (step 3) before trying to reconnect. The time each side waits before trying to reconnect can be the same or different, as shown in FIG. 3. The nodes can attempt to reconnect by sending SA path record requests to the SM (step 4). After the SA path record responses are received (step 5), a connection request can be sent (step 6).

In the illustrated case in FIG. 3, the backoff time chosen by the two nodes in step 3 was almost the same. Thus, even though node D got the SA path record response slightly faster than node C, and tried to initiate the connection first in step 6, the connection request did not reach node C before node C sent a connection request itself. In this case, both of the protocol ends have an outstanding connection request. Then, when the nodes receive the connection request from their peer, the nodes will reject the connect request (step 7). In step 8, the two nodes chose a random backoff time once more before they retry to reconnect. This time the random backoff time chosen by node D is significantly longer than the one chosen by node C. As a result, node C gets the priority and repeats the connection establishment process; sends an SA path record request (step 8), receives a response from the subnet manager (step 10), sends a connection request to node D (step 11), and the connection request reaches node D before node D attempts to initiate a connection itself with node C. In the situation depicted in FIG. 3, node D accepts the incoming connection (step 12). The communication can then resume for the upper layer application in steps 13 and 14.

Extrapolated out of FIG. 3, it becomes apparent that the subnet manager can become bombarded with SA path requests in the event of a VM migration (breaking communication). In a large subnet with thousands of nodes, even if only one additional SA query is sent from each node, the SM can end up being flooded with thousands of messages. When live migrations take place in a dynamic IB-based cloud, many excessive SA queries can be sent. The amount of SA queries increases polynomially as the number of nodes in the network increases. The disclosed methods and systems provide a caching mechanism that can reduce the number of SA queries sent by the nodes in a subnet to the subnet manager.

Figure 4:
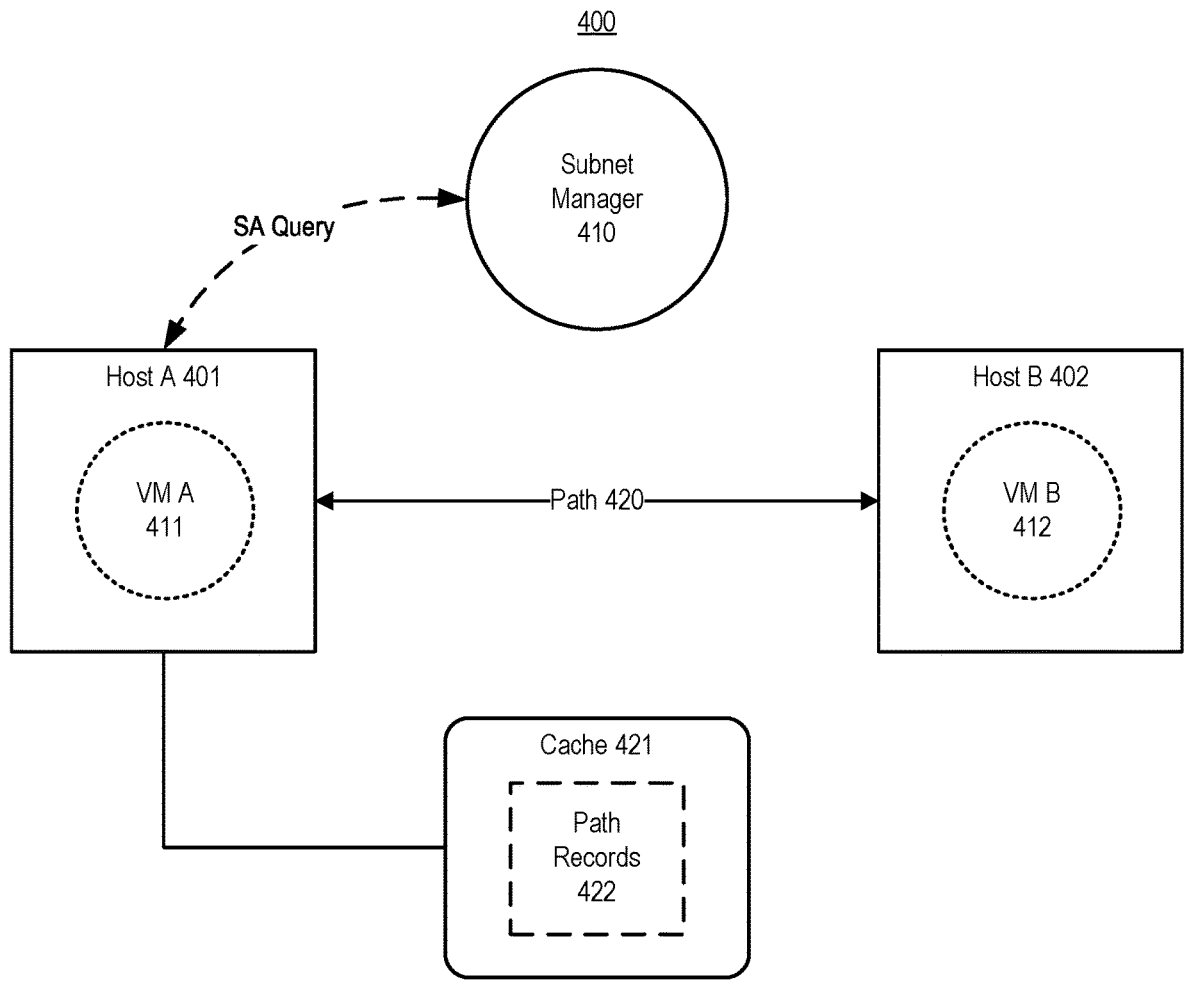
FIG. 4 shows an illustration of supporting SA path caching in a cloud environment, in accordance with an embodiment.

FIG. 4 shows an illustration of supporting SA path caching in a cloud environment, in accordance with an embodiment of the invention. As shown in FIG. 4, an InfiniBand (IB) subnet 400 can include a subnet manager (SM) 410 and a plurality of host nodes A-B 401-402.

The first time when a source host node A 401 (e.g. VM A 411) attempts to communicate with a destination host node B 402 (e.g. VM B 412), the source host node A 401 can send a SA path record request to the SM 410. Then, the source host node can use a local cache 421 to store the path information (e.g. path records 422).

Furthermore, when the source host node A 401 attempts to reconnect to the same destination host node B 402, the source host node A 401 can look up the address of the destination host node in the caching table in the local cache 421 instead of sending a request to the subnet manager.

If the path information is found, the source host node A 401 can connect to the destination host node B 402 using the path 420 as indicated by the path records 422, with no SA query sent to the SM 410. Otherwise, the source host node A 401 can send a SA path record request to the SM 410 to obtain the necessary path information.

Figure 5:
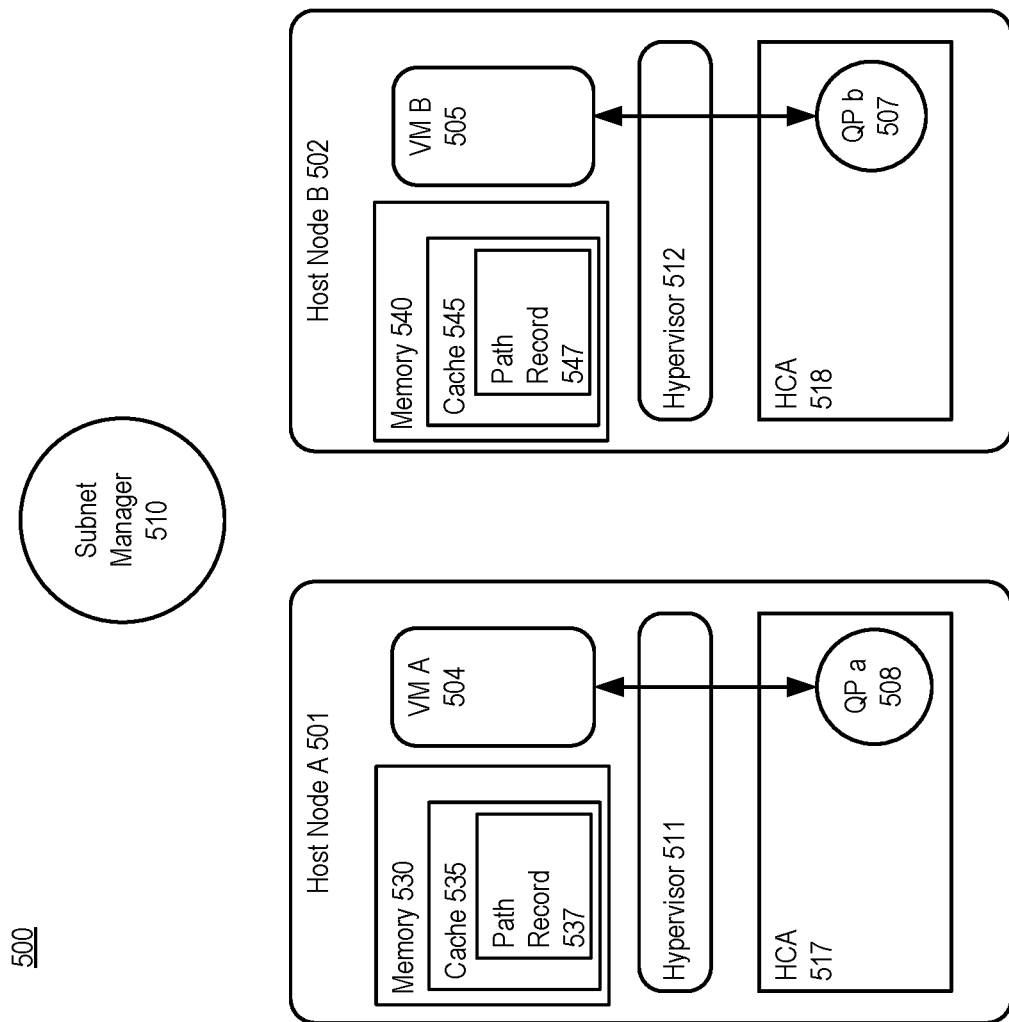
FIG. 5 shows an illustration of supporting SA path caching in a cloud environment, in accordance with an embodiment of the invention.

FIG. 5 shows an illustration of supporting SA path caching in a cloud environment, in accordance with an embodiment of the invention. More particularly, FIG. 5 shows an illustration of supporting SA path caching within a subnet of an InfiniBand environment.

As shown in FIG. 5, an InfiniBand (IB) subnet 500 can include a plurality of host nodes A-B 501-502, which support the different hypervisors 511-512. Additionally, each hypervisor 512-513 allows various virtual machines (VMs) to run on top of it. For example, the hypervisor 511 on the host node A 101 can support the VM A 504, and hypervisor 512 on host node B can support VM B 505.

Furthermore, each of the host nodes A-B 501-502 can be associated with one or more host channel adapters (HCAs) 517-518. As shown in FIG. 5, the HCA 517 on the host node A 501 can take advantage the queue pairs (QP), such as QP a 508, which can be used by VM A 504, while the HCA 518 on the host node B 502 can take advantage QP b 507, which can be used by VM B 505.

In accordance with an embodiment, each host node can also support a memory 530, 540, which each can contain a cache (such as a local cache) 535, 545, and in turn each cache can include one or more path records 537, 547, which can be stored in a cache table.

Also, the IB subnet 500 can include a subnet manager 510, which can be responsible for the network initialization, configuration of IB ports on switches and HCAs, topology discovery and path computation.

In accordance with an embodiment, the first time a source host node A 501 (e.g. VM A 504) attempts to communicate with a destination host node B 502 (e.g. VM B 505), the source host node A 501 can send a SA path record request to the SM 510. Then, the source host node can use a local cache 535 to store the path information (e.g. path record 537).

Furthermore, when the source host node A 501 attempts to reconnect to the same destination host node B 502, the source host node A 501 can look up the address of the destination host node in the cache 535 instead of sending a request to the subnet manager.

In accordance with an embodiment, if the path information is found, the source host node A 501 can connect to the destination host node B 502 by using the path indicated in the path record 537, with no SA query sent to the SM 510. Otherwise, the source host node A 501 can send a SA path record request to the SM 410 to obtain the necessary path information.

In accordance with an embodiment, in a situation where host node A 501 sends a SA path record request to the subnet manager 510, the response received can include a caching flag that can indicate to the host node A 501 to use a local caching table (within the cache 535) to store the path characteristics associated with the given GID address of the destination host node B 502 (DGID).

Figure 6:
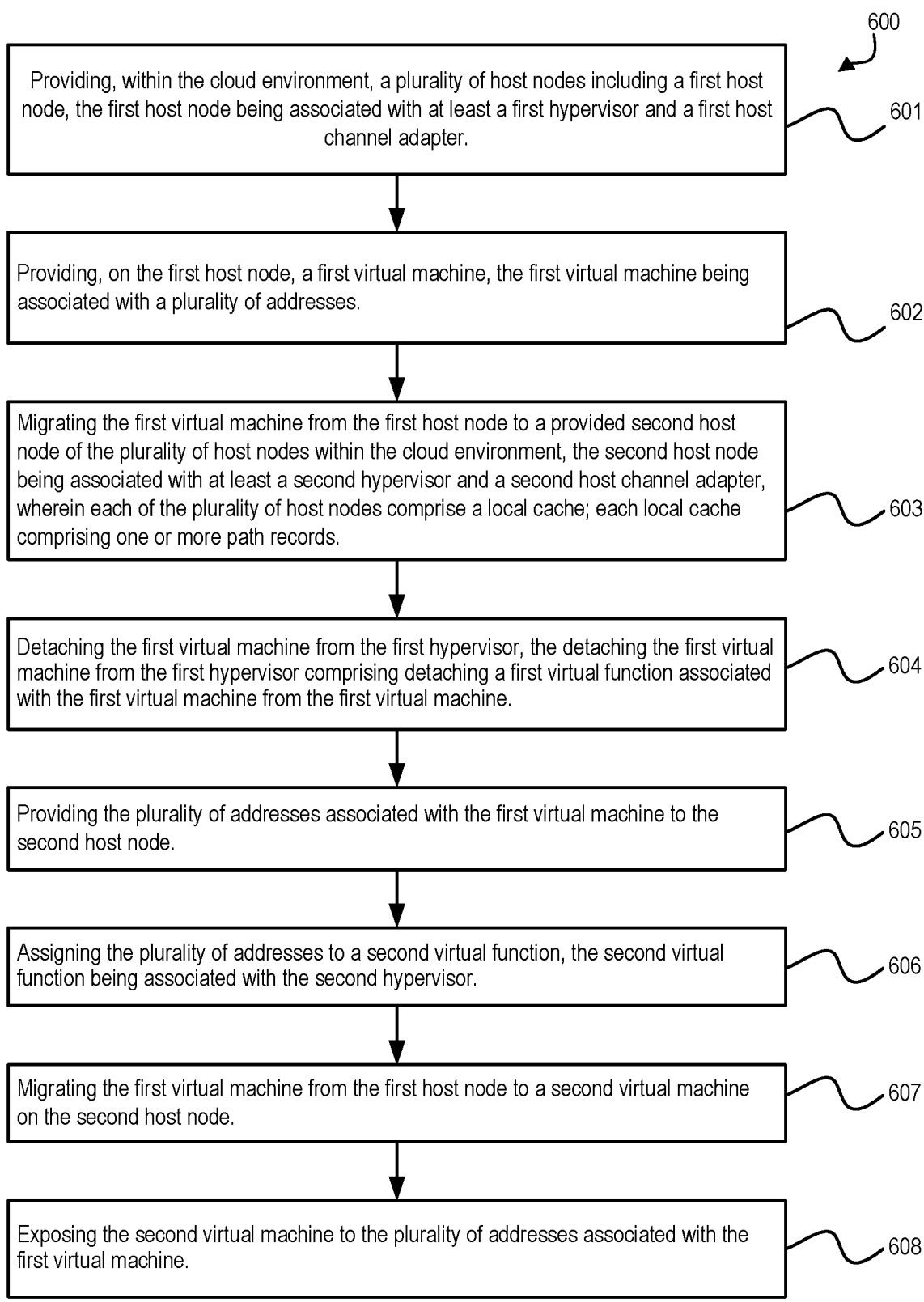
FIG. 6 shows an illustration of a method for supporting subnet management in a cloud environment, according to an embodiment.

FIG. 6 shows an illustration a method for supporting subnet management in a cloud environment, according to an embodiment. The exemplary method 600 can begin at step 601 with providing, within the cloud environment, a plurality of host nodes including a first host node, the first host node being associated with at least a first hypervisor and a first host channel adapter. At step 602, the method can continue with providing, on the first host node, a first virtual machine, the first virtual machine being associated with a plurality of addresses. At step 603, the method continues with migrating the first virtual machine from the first host node to a provided second host node of the plurality of host nodes within the cloud environment, the second host node being associated with at least a second hypervisor and a second host channel adapter, wherein each of the plurality of host nodes comprise a local cache; each local cache comprising one or more path records.

In accordance with an embodiment, migrating the first virtual machine can comprise, at step 604, detaching the first virtual machine from the first hypervisor, the detaching the first virtual machine from the first hypervisor comprising detaching a first virtual function associated with the first virtual machine from the first virtual machine. At step 605, the method continues with providing the plurality of addresses associated with the first virtual machine to the second host node. At step 606, the method can assign the plurality of addresses to a second virtual function, the second virtual function being associated with the second hypervisor. At step 607, the method can migrate the first virtual machine from the first host node to a second virtual machine on the second host node. At step 608, the method can conclude with exposing the second virtual machine to the plurality of addresses associated with the first virtual machine.

In accordance with an embodiment, the SA path record caching mechanism can be implemented in a protocol, such as an RDS protocol, and a caching table can be stored in the memory of each node. A program, as shown in the below pseudo code can be used:

```
1:    private bool SA PathCachingEnabled
2:    private list SA PathRecordCacheTable
3:
4:    procedure RDSMODULEINITIALIZATION
5:    // The Caching table is initialized
6:    SA PathRecordCacheTable = empty
7:
8:    // The system does not know yet if SA Path Caching is
9:    // enabled by the SM, so we assume not.
10:   SA PathCachingEnabled = False
11:   end procedure
12:
13:   procedure (RE-)CONNECTIONESTABLISHMENT(DGID)
14:   struct PathRecord DST Path = NULL
15:
16:   // Use the cache only if the SA Path Caching is
```

-continued

```
17:     // enabled by the SM
18:     if SA PathCachingEnabled then
19:         if DGID in SA PathRecordCacheTable.
20:             DGIDs then
21:             DST Path = Cached PathRecord
22:         end if
23:     end if
24:
25:     // If DST Path is NULL at this point, either the
26:     // cache is disabled by the SM, or the path
27:     // characteristics for the host with the given DGID
28:     // have never been retrieved. In any case, a
29:     // send a PathRecord Query can be sent to the SM.
30:     if DST Path == NULL then
31:         SendAnewSA PathRecordQueryToTheSM
32:         WaitForTheReply
33:         DST Path = PathRecordResponse
34:
35:         // If caching is enabled by the SM the reply will
36:         // have the reserved field in the PathRecord set
37:         // to 1. If not, the reserved field is 0
38:         if DST Path ! Reserved Field != 0 then
39:             SA PathCachingEnabled = True
40:
41:         // Insert the DST Path in the caching table
42:         SA PathRecordCacheTable.append(
43:             DST Path)
44:         end if
45:     end if
46:     connect to(DST Path)
47: end procedure
```

In accordance with an embodiment, the first time a source host (SHost) attempts to communicate with a destination host (DHost), the SHost can send an SA path record request to the subnet manager. If the response has the caching flag raised, the SHost can use a local caching table to store the path characteristics associated with the given GID address of the DHost (DGID). Moreover, the SHost now is aware that caching is supported by the subnet manager, so the next time the SHost attempts to connect or reconnect with any DHost, it will look up in the caching table first. If the path information for the given DHost is found, the SHost can be prevented from sending a SA query sent to the subnet manager, and SHost can instead attempt to connect with the DHost using the information within its caching table.

Referring again to FIG. 3, with reference to the interrupted connection (step 2), in a system where the above described caching mechanism is enabled, no SA queries need to be sent to the subnet manager. In the case described in FIG. 3, the steps 4, 5, 9, and 10 are eliminated, thus, the connection re-establishment is faster and the load (e.g., SA path requests and responses) on the subnet manager is lower.

Many features of the present invention can be performed in, using, or with the assistance of hardware, software, firmware, or combinations thereof. Consequently, features of the present invention may be implemented using a processing system (e.g., including one or more processors).

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting subnet management in a cloud environment, comprising:
   providing, at a computer comprising a microprocessor, a subnet, the subnet comprising;
      a plurality of host nodes, and
      one or more switches, wherein the plurality of host nodes are interconnected via the one or more switches; and storing, at a cache of a first host node of the plurality of host nodes, a path record;
wherein the path record is associated with a second host node to which the first node has established communication with;
wherein the stored path record is received at the first host node in a response message to a query sent to a subnet manager by the first host node;
wherein the response message comprises a caching flag, set by the subnet manager; and
wherein the caching flag instructs the first host node to store the path record at the cache of the first host node, wherein the path record comprises addressing information of the second host node.

2. The method of claim 1,
wherein the first host node comprises a virtual machine; and
wherein the second host node comprises a virtual machine.

3. The method of claim 1,
wherein the prior to storing, at the cache of the first host node, the cache is initialized.

4. The method of claim 3,
wherein the initialization of the cache is implemented via a Reliable Datagram Socket protocol.

5. The method of claim 1, wherein the path record further comprises a plurality of characteristics, the plurality of characteristics comprising a service level and a maximum transmission unit.

6. The method of claim 1, wherein the first host node is configured to utilize the stored path record to reestablish communication with the second host node upon a break in communication between the first host node and the second host node.

7. A system for supporting subnet management in a cloud environment, comprising:
a computer comprising a microprocessor; and
a subnet, the subnet comprising:
a plurality of host nodes, and
one or more switches, wherein the plurality of host nodes are interconnected via the one or more switches;
wherein a path record is stored at a cache of a first host node of the plurality of host; and
wherein the path record is associated with a second host node to which the first node has established communication with;
wherein the stored path record is received at the first host node in a response message to a query sent to a subnet manager by the first host node;
wherein the response message comprises a caching flag, set by the subnet manager; and
wherein the caching flag instructs the first host node to store the path record at the cache of the first host node, wherein the path record comprises addressing information of the second host node.

8. The system of claim 7,
wherein the first host node comprises a virtual machine; and
wherein the second host node comprises a virtual machine.

9. The system of claim 7,
wherein the prior to storing, at the cache of the first host node, the cache is initialized.

10. The system of claim 9,
wherein the initialization of the cache is implemented via a Reliable Datagram Socket protocol.

11. The system of claim 7, wherein the path record further comprises a plurality of characteristics, the plurality of characteristics comprising a service level and a maximum transmission unit.

12. The system of claim 7, wherein the first host node is configured to utilize the stored path record to reestablish communication with the second host node upon a break in communication between the first host node and the second host node.

13. A non-transitory machine-readable storage medium having instructions stored thereon for supporting subnet management in a cloud environment that when executed cause a system to perform steps comprising:
providing, at a computer comprising a microprocessor, a subnet, the subnet comprising:
a plurality of host nodes, and
one or more switches, wherein the plurality of host nodes are interconnected via the one or more switches; and
storing, at a cache of a first host node of the plurality of host nodes, a path record;
wherein the path record is associated with a second host node to which the first node has established communication with;
wherein the stored path record is received at the first host node in a response message to a query sent to a subnet manager by the first host node;
wherein the response message comprises a caching flag, set by the subnet manager; and
wherein the caching flag instructs the first host node to store the path record at the cache of the first host node, wherein the path record comprises addressing information of the second host node.

14. The non-transitory machine-readable storage medium of claim 13,
wherein the first host node comprises a virtual machine; and
wherein the second host node comprises a virtual machine.

15. The non-transitory machine-readable storage medium of claim 13,
wherein the prior to storing, at the cache of the first host node, the cache is initialized; and
wherein the initialization of the cache is implemented via a Reliable Datagram Socket protocol.

16. The non-transitory machine-readable storage medium of claim 13, wherein the path record further comprises a plurality of characteristics, the plurality of characteristics comprising a service level and a maximum transmission unit.

17. The non-transitory machine-readable storage medium of claim 13, wherein the first host node is configured to utilize the stored path record to reestablish communication with the second host node upon a break in communication between the first host node and the second host node.

* * * * *